Patented Apr. 25, 1944

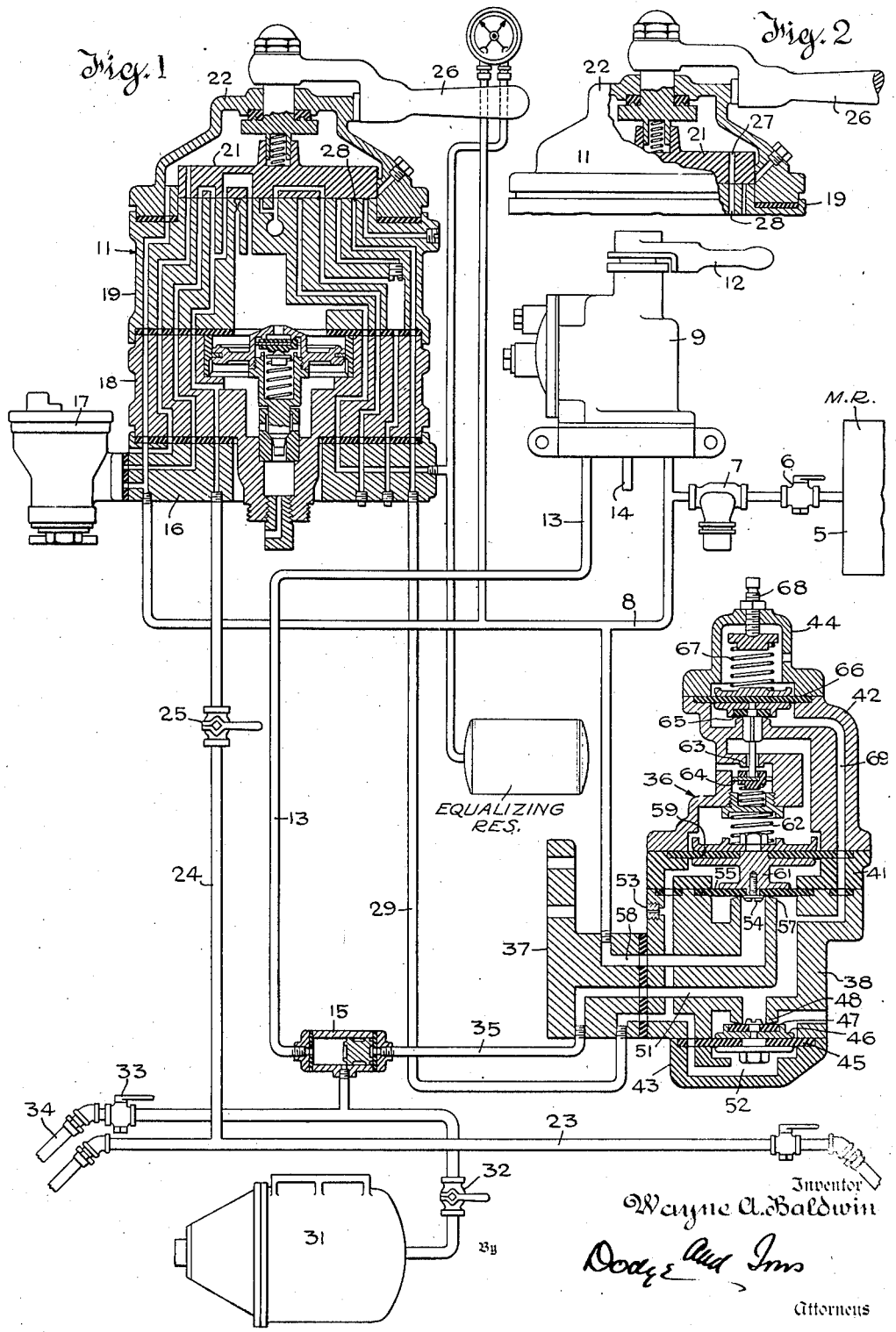

2,347,536

UNITED STATES PATENT OFFICE 2,347,536

AIR BRAKE

Wayne A. Baldwin, Watertown, N. Y., assignor to The New York Air Brake Company, a corporation of New Jersey Application June 9, 1943, Serial No. 490,217

6 Claims. (Cl. 303—13)

This invention relates to air brakes and particularly to a simplified equipment for switching locomotives.

It is common practice to equip switching locomotives with an engineer's brake valve and brake pipe for controlling the brakes on connected cars on the automatic principle, but having no connection whatever with the locomotive brake cylinders. In such case the locomotive brakes are controlled on the straight air principle by an independent brake valve, which may be of the self-lapping type. This scheme is adopted to save the substantial expense of installing and maintaining a distributing valve.

The present invention provides a simple relay valve, of inexpensive construction, and simple connections by means of which the locomotive brakes are caused to apply whenever the automatic brake valve is moved to emergency positions. This gives an emergency application on engine and cars by manipulation of one valve. This is desirable. Control of service applications on the locomotive by the automatic brake valve is wholly unnecessary, in switching service.

Very generally stated, use is made of a relay valve which is energized by air delivered through the sanding port of the automatic brake valve in emergency position. Any port which delivers air under pressure in emergency position could be used in lieu of the sanding port.

Associated with the relay valve are a pressure actuated exhaust valve, and a pressure limiting valve, the latter of which may be adjusted to limit to any appropriate amount the pressure developed in the locomotive brake cylinders upon energization of the relay. Thus the relay need have neither exhaust nor graduating functions. It simply opens and closes.

A preferred embodiment of the invention will now be described by way of example, reference being made to the accompanying drawing, in which:

Figure 1 is a diagram of the locomotive brake equipment. The automatic brake valve is shown in sectional diagram in running position and the relay and associated mechanism are shown in axial section in release position. The self-lapping independent brake valve is shown in elevation in release position.

Figure 2 is a fragmentary section of the automatic engineer's brake valve in emergency position.

Referring now to Figure 1 the main reservoir 5 is charged by any suitable means such as a compressor. It is connected through the normally open cutout cock 6, dust collector 7 and pipe 8 with the independent brake valve generally indicated at 9 and with the automatic brake valve generally indicated at 11.

The independent brake valve 9 may be of any suitable construction. The one illustrated will be recognized as of the familiar self-lapping type. It is operated by a handle 12 which in release position vents the pipe 13 through the exhaust connection 14, and in its various application positions develops different pressures in the pipe 13 according to the position of the handle 12. The pipe 13 leads to one end of the housing of the double throw check valve 15.

The engineer's brake valve generally indicated at 11 is of familiar construction and comprises a pipe bracket 16 on which is mounted the feed valve 17. Above the pipe bracket 16 is the equalizing portion 18, containing the equalizing discharge valve. Above portion 18 is the valve seat portion 19. The rotary valve 21 is mounted on the valve seat at the top of portion 19 and is enclosed by the cap 22. Main reservoir air is supplied to the space within the cap above the rotary valve 21.

The brake valve performs the ordinary function of controlling the pressure in the brake pipe 23 to which the valve is connected through the pipe 24 and the normally open cock 25. The rotary valve 21 is shifted to its various positions by the valve handle 26. The functional positions are ordinarily release, running, lap, service and emergency, and the valve performs the conventional and well known automatic brake controlling functions in these positions. The valve illustrated is intended to be typical of any automatic engineer's brake valve.

In emergency position (see Fig. 2) a through port 27 in the rotary valve 21 registers with a pressure port 28 in the valve seat. The port 28 is in communication with the control pipe 29. The ports 27 and 28 may as a matter of fact be the well known sanding port, commonly found in engineer's brake valves of this type. Any port which would supply main reservoir air to the control pipe 29 in emergency position, might be used, within the scope of the invention.

A single locomotive brake cylinder is illustrated at 31. It is connected through the cutout cock 32 to the side port of the double throw check valve 15 and may be connected through the angle cock 33 and flexible hose 34 with a similar brake cylinder on the locomotive tender (not shown). The cylinder 31 typifies any brake applying motor or motors on the engine or on the engine and tender. The usual steam switcher has a tender. A Diesel electric switcher does not. The invention is applicable to either. It will be observed that the brake cylinder 31 is not even indirectly related to the brake pipe 23.

In conventional switch engine installations made heretofore the pipe 13 was commonly connected directly with the brake cylinder 31, there being no double throw check valve. With such connections the independent brake valve 9 alone controlled the locomotive brakes, and the only brakes which could be controlled by the automatic engineer's brake valve 11 were the automatic brakes on cars whose brake pipes were connected with the brake pipe 23.

The double throw check valve 15 serves to connect the brake cylinder 31 alternatively with the pipe 13 and with the pipe 35 leading to the relay generally indicated by the numeral 36. The check valve permits the independent valve 9 to exercise independent control of the brake cylinder 31 operating on the straight air principle. The relay valve 36 responds in emergency position to pressure developed in control pipe 29 and supplies main reservoir air to the brake cylinder 31. The automatic engineer's brake valve 11 thus serves to apply the locomotive brakes when moved to emergency position but not otherwise.

The relay valve 36 is mounted on a pipe bracket 37 to which are connected the branch brake cylinder pipe 35, control pipe 29 and a branch of the main reservoir pipe 8.

The housing of the relay valve 36 is composed of three body portions 38, 41 and 42. At the lower end is a cap 43 which encloses a release valve and at the upper end is a cap 44 which encloses the loading spring of the pressure limiting valve. The form and porting of the body components and caps are clearly shown in Figure 1 and an elaborate description is unnecessary. Between the cap 43 and the body 38 is clamped a flexible diaphragm 45. The marginal portion of the diaphragm serves as a gasket and the central portion of the diaphragm carries a bearer plate 46 and valve disc 47. This disc seats on the annular seat 48 to control communication between passage 51 with which the pipe 35 is connected and atmosphere. It will be observed that the space above the diaphragm 45 is freely vented to atmosphere. The space 52 below the diaphragm 45 is in free communication with the control pipe 29.

The diaphragm valve just described comprises a normally open release valve for the brake cylinder 31. When the control pipe 29 is not under pressure, the valve disc 47 drops away from its seat, so that pipe 35 is vented to atmosphere. The pipe 29 is vented by a choke 53 shown mounted in the portion 38 of the body. This choke has sufficient capacity to ensure a reasonably prompt release of the brakes when the port 28 (see Fig. 2) is blanked but not sufficient capacity to dissipate pressure built up by flow through the control pipe 29 in emergency position.

Between the portion 38 and the portion 41 is a combined diaphragm and gasket 55. The diaphragm 55 acts as a valve against the annular seat 57 which controls flow from the main reservoir connection 8 arriving by way of port 58 and the annular space beneath the diaphragm 55 and encircling the valve seat 57.

A substantially larger diaphragm 59 is clamped between the portions 41 and 42. Its marginal portion serves as a gasket and its central portion carries clamping plates clearly shown in the drawing and provided with extension 61 which is connected with the center of diaphragms 55 by screw 54. The space below the diaphragm 59 is in communication with control pipe 29. The diaphragm is biased downward by a coil compression spring 62.

Under running conditions and at the start of emergency applications, until the desired braking pressure has been developed in cylinder 31, the space above the diaphragm is vented to atmosphere through seat 63 past spring loaded poppet valve 64. This valve is held away from its seat against the urge of its spring by a stem extending from an opposed poppet valve 65, which is carried by a diaphragm 66. The diaphragm 66 is clamped between the portion 42 and the cap 44. Its peripheral portion serves as a gasket and its central portion carries clamping plates on the lower one of which the valve 65 is mounted. The valve and diaphragm are biased downward by a coil compression spring 67 which may be adjustably loaded by means of the thrust screw 68.

The space above the diaphragm 66 is freely vented to atmosphere as shown. The spring 67 holds the valve 65 closed, and the valve 64 open, until the pressure beneath the diaphragm 66 rises sufficiently to overpower the spring 67. When this occurs, the valve 65 opens, the valve 64 closes, and pressure is developed above the diaphragm 59. The effect of this is to stop the development of brake cylinder pressure at a chosen value, since the space below the diaphragm 66 is in communication with the pipe 35 through a passage 69 in the housing.

*Operation*

If the locomotive is running light, the brake cylinder 31 will be operated by manipulating the handle 12 of the independent brake valve 9. If the engine is connected to cars, the brake handle 26 of the automatic brake valve 11 would be operated between release, running, lap, and service positions to control the car brakes alone. Within this range of positions independent valve 9 will exercise exclusive control of the locomotive brakes, and while doing so will retain the valve element of the double throw check valve 15 to the right (the position shown in Figure 1).

Suppose now that the engineer moves the handle 26 to emergency position. Prior to that time the control pipe 29 would have been vented through the choke 53 so that the relay valve 36 would be in the condition illustrated in Figure 1.

The rapid supply of main reservoir air to control pipe 29 in emergency position immediately develops sufficient pressure below diaphragm 45 to close the exhaust valve 47. The passage 58 is always at main reservoir pressure, but this pressure acting in a small area at the center of diaphragm 55 cannot overpower spring 62. The development of main reservoir pressure or an approximation of main reservoir pressure in control pipe 29 develops similar pressure between the diaphragms 55 and 59. Since the diaphragm 59 is substantially larger than diaphragm 55, both diaphragms move upward overpowering spring 62 and admitting main reservoir air from passage 58 past valve seat 57 through passage 51 and pipe 35 to the righthand end of the double throw check valve 15.

The check valve will shift to the left connecting the pipe 35 with the brake cylinder 31. The braking pressure which is thus developed in the pipe 35 will be communicated by the ports 51 and 69 to the space below the diaphragm 66. When the pressure rises sufficiently to overpower spring 67 the valves 65 and 64 will shift so that brake cylinder pressure instead of atmospheric pressure becomes effective above diaphragm 59. This will cause the diaphragms 55 and 59 to move downwardly, diaphragm 55 sealing on seat 57 and terminating the flow of main reservoir air to the brake cylinder.

As long as the brake valve 11 remains in emergency position, brake cylinder 31 will be kept under pressure. As soon as the brake valve is moved away from the emergncy position, the supply of air to control pipe 29 stops. The choke 53 will quickly dissipate the pressure in the control pipe 29, and the relay will assume the condition shown in Figure 1 in which valve 47 opens and vents the brake cylinder, and diaphragm 55 closes against seat 57 and terminates the flow of main reservoir air to the brake cylinder.

The invention provides a very simple installation because the relay need have no graduating characteristics. It simply opens or closes off the supply of air to the brake cylinder. The pressure limiting mechanism causes the relay to close, when the desired maximum braking pressure is attained. The independent exhaust valve closes the normally open exhaust.

While this very simple type of relay is preferred, other relays might be used. The most significant aspect of the invention is the use of a control pipe put under pressure in emergency position of the automatic brake valve, to operate some type of relay which applies the locomotive brakes.

What is claimed is:

1. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder; and relay means operating in response to the development of pressure in the control connection to admit air under pressure from said supplying means to the brake cylinder, and in response to dissipation of pressure in the control connection to vent the brake cylinder.

2. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder; relay means operating in response to the development of pressure in the control connection to admit air under pressure from said supplying means to the brake cylinder, and in response to dissipation of pressure in the control connection to vent the brake cylinder; and means for limiting the pressure developed in the brake cylinder.

3. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder; a normally open valve controlling an exhaust path from the brake cylinder; motor means operable by pressure developed in the control connection to close said normally open valve; a normally closed valve controlling flow from said air supplying means to the brake cylinder; and motor means operable by pressure developed in the control connection to open said normally closed valve.

4. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder; a normally open valve controlling an exhaust path from the brake cylinder; motor means operable by pressure developed in the control connection to close said normally open valve; a normally closed valve controlling flow from said air supplying means to the brake cylinder; motor means operable by pressure developed in the control connection to open said normally closed valve; and pressure responsive means subject to pressure in the brake cylinder and serving to reclose said normally closed valve upon the attainment of a chosen brake cylinder pressure.

5. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder; a normally open valve controlling an exhaust path from the brake cylinder; motor means operable by pressure developed in the control connection to close said normally open valve; a motor actuated valve of the differential diaphragm type controlling flow of air from the air supplying means to the brake cylinder, said valve being biased in a closing direction; and means whereby development of pressure in the control connection reverses said bias to cause the valve to open.

6. The combination of means for supplying air under pressure; a brake pipe; an engineer's brake valve of the automatic type arranged to be supplied with air by said supply means and serving to control pressure in the brake pipe, said valve having an emergency position in which it vents the brake pipe, and admits air under pressure to a control connection forming part of the valve; means for bleeding said control connection at a rate less than the rate of supply thereto in emergency position; a brake cylinder;

a normally open valve controlling an exhaust path from the brake cylinder; motor means operable by pressure developed in the control connection to close said normally open valve; a motor actuated valve of the differential diaphragm type controlling flow of air from the air supplying means to the brake cylinder, said valve being biased in a closing direction; means whereby development of pressure in the control connection reverses said bias to cause the valve to open; and means responsive to the attainment of a chosen brake cylinder pressure for restoring the first named bias.

WAYNE A. BALDWIN.